United States Patent
Ouderkirk et al.

(10) Patent No.: US 10,606,094 B2
(45) Date of Patent: Mar. 31, 2020

(54) POLARIZING BEAM SPLITTER PLATES PROVIDING HIGH RESOLUTION IMAGES AND SYSTEMS UTILIZING SUCH POLARIZING BEAM SPLITTER PLATES

(71) Applicant: 3M INNOVATIVE PROPERTIES COMPANY, St. Paul, MN (US)

(72) Inventors: Andrew J. Ouderkirk, St. Paul, MN (US); Joseph C. Carls, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/543,910

(22) Filed: Aug. 19, 2019

(65) Prior Publication Data
US 2019/0369410 A1   Dec. 5, 2019

Related U.S. Application Data

(60) Continuation of application No. 15/813,392, filed on Nov. 15, 2017, now Pat. No. 10,429,662, which is a
(Continued)

(51) Int. Cl.
*G02B 27/28* (2006.01)
*G02B 5/30* (2006.01)
(Continued)

(52) U.S. Cl.
CPC ........ *G02B 27/283* (2013.01); *B32B 37/0038* (2013.01); *B32B 37/1018* (2013.01);
(Continued)

(58) Field of Classification Search
CPC ............ B23B 37/0038; B23B 37/1018; B23B 37/1027; B23B 37/1284; B23B 37/18; B23B 37/10
See application file for complete search history.

(56) References Cited

U.S. PATENT DOCUMENTS 2,403,731 A   7/1946   Macneille
3,610,729 A   10/1971  Rogers
(Continued)

FOREIGN PATENT DOCUMENTS

JP   2000-249832   9/2000
JP   2004-170949   6/2004
(Continued)

OTHER PUBLICATIONS

International Search for PCT International application No. PCT/US2013/054247, dated Nov. 7, 2013, 4pgs.

*Primary Examiner* — Seahvosh Nikmanesh
(74) *Attorney, Agent, or Firm* — Robert S. Moshrefzadeh (57) ABSTRACT

Polarizing beam splitter plates and systems incorporating such beam splitter plates are described. The polarizing beam splitter plate includes a first substrate and a multilayer optical film reflective polarizer that is disposed on the first substrate. The polarizing beam splitter plate includes a first outermost major surface and an opposing second outermost major surface that makes an angle of less than about 20 degrees with the first outermost major surface. The polarizing beam splitter plate is adapted to reflect an imaged light received from an imager towards a viewer or screen with the reflected imaged light having an effective pixel resolution of less than 12 microns.

10 Claims, 6 Drawing Sheets

Related U.S. Application Data division of application No. 14/406,570, filed as application No. PCT/US2013/054247 on Aug. 9, 2013, now Pat. No. 9,851,576.

(60) Provisional application No. 61/683,390, filed on Aug. 15, 2012.

(51) Int. Cl.
| | | |
|---|---|---|
| *B32B 37/00* | (2006.01) | |
| *B32B 37/10* | (2006.01) | |
| *B32B 37/12* | (2006.01) | |
| *B32B 37/18* | (2006.01) | |
| *B32B 38/10* | (2006.01) | |
| *G03B 21/20* | (2006.01) | |

(52) U.S. Cl.
CPC ...... *B32B 37/1027* (2013.01); *B32B 37/1284* (2013.01); *B32B 37/18* (2013.01); *B32B 38/10* (2013.01); *G02B 5/3041* (2013.01); *G03B 21/2073* (2013.01); *B32B 2037/109* (2013.01); *B32B 2551/00* (2013.01)

(56) References Cited

U.S. PATENT DOCUMENTS

| | | | |
|---|---|---|---|
| 5,080,739 A | 1/1992 | Fernandez et al. | |
| 5,815,221 A | 9/1998 | Kojima | |
| 5,882,774 A | 3/1999 | Jonza | |
| 5,982,541 A | 11/1999 | Li et al. | |
| 6,147,802 A | 11/2000 | Itoh | |
| 6,179,948 B1 | 1/2001 | Merrill | |
| 6,239,908 B1 | 5/2001 | Kelly | |
| 6,252,709 B1 | 6/2001 | Sato | |
| 6,407,766 B1 | 6/2002 | Ramanujan | |
| 6,609,795 B2 | 8/2003 | Weber | |
| 6,623,861 B2 | 9/2003 | Martin et al. | |
| 6,630,980 B2 | 10/2003 | Sobrinho | |
| 6,764,181 B2 | 7/2004 | Magarill et al. | |
| 6,791,750 B2 | 9/2004 | Masubuchi et al. | |
| 6,806,990 B2 | 10/2004 | Yoshikawa et al. | |
| 6,827,886 B2 | 12/2004 | Neavin | |
| 6,984,041 B2 | 1/2006 | Suzuki et al. | |
| 7,234,816 B2 | 6/2007 | Bruzzone | |
| 7,357,511 B2 | 4/2008 | Aastuen et al. | |
| 7,690,796 B2 | 4/2010 | Bin | |
| 7,901,083 B2 | 3/2011 | Destain | |
| 8,066,381 B2 | 11/2011 | Sunaga | |
| 9,488,848 B2 | 11/2016 | Ouderkirk et al. | |
| 9,535,256 B2 | 1/2017 | Cads et al. | |
| 9,841,600 B2 | 12/2017 | Ouderkirk et al. | |
| 9,851,576 B2 | 12/2017 | Ouderkirk et al. | |
| 2001/0046032 A1 | 11/2001 | Takezawa et al. | |
| 2005/0185139 A1 | 8/2005 | Yamanaka | |
| 2006/0084780 A1 | 4/2006 | Hebrink | |
| 2006/0221447 A1 | 10/2006 | DiZio | |
| 2006/0226561 A1 | 10/2006 | Merrill | |
| 2006/0291054 A1 | 12/2006 | Tomoguchi | |
| 2007/0023941 A1 | 2/2007 | Duncan et al. | |
| 2007/0047080 A1 | 3/2007 | Stover | |
| 2008/0079903 A1 | 4/2008 | DiZio | |
| 2009/0046253 A1 | 2/2009 | Sunaga | |
| 2009/0128903 A1 | 5/2009 | Sano | |
| 2009/0231555 A1 | 9/2009 | Nagarekawa et al. | |
| 2010/0277786 A1 | 11/2010 | Anderson | |
| 2011/0051029 A1 | 3/2011 | Okumura | |
| 2014/0176818 A1 | 6/2014 | Watson et al. | |
| 2014/0326398 A1* | 11/2014 | Carls ................... | G02B 27/283 156/230 |
| 2015/0219896 A1 | 8/2015 | Ouderkirk et al. | |
| 2017/0075126 A1 | 3/2017 | Carls et al. | |
| 2018/0059423 A1 | 3/2018 | Ouderkirk et al. | |

FOREIGN PATENT DOCUMENTS

| | | |
|---|---|---|
| JP | 2005-309035 | 11/2005 |
| JP | 2005-352174 | 12/2005 |
| JP | 2007-264010 | 10/2007 |
| WO | WO 01/22130 | 3/2001 |
| WO | WO 2007-013989 | 2/2007 |
| WO | WO 2010/005853 | 1/2010 |
| WO | WO 2013-081822 | 6/2013 |
| WO | WO 2013-082020 | 6/2013 |
| WO | WO 2014-004228 | 1/2014 |
| WO | WO 2014-031417 | 2/2014 |

* cited by examiner

POLARIZING BEAM SPLITTER PLATES PROVIDING HIGH RESOLUTION IMAGES AND SYSTEMS UTILIZING SUCH POLARIZING BEAM SPLITTER PLATES

CROSS REFERENCE TO RELATED APPLICATIONS

This application is related to the U.S. Patent Application Ser. No. 61/564,161, "Polarizing Beam Splitters Providing High Resolution Images and Systems Utilizing Such Beam Splitters", filed Nov. 28, 2011; and the U.S. Patent Application Ser. No. 61/564,172, "Method of Making Polarizing Beam Splitters Providing High Resolution Images and Systems Utilizing Such Beam Splitters", filed Nov. 28, 2011 which are incorporated herein by reference in their entireties.

FIELD

The present description relates to polarizing beam splitter plates and systems incorporating such beam splitter plates. More specifically, the present description relates to polarizing beam splitter plates and systems with such beam splitter plates that incorporate multilayer optical films and reflect imaged light towards a viewer or a viewing screen with high effective resolution.

BACKGROUND

Illumination systems incorporating polarizing beam splitters (PBSs) are used to form images on viewing screens, such as projection displays. A typical display image incorporates an illumination source that is arranged so that light rays from the illumination source reflect off of an image-forming device (i.e., an imager) that contains the desired image to be projected. The system folds the light rays such that the light rays from the illumination source and the light rays of the projected image share the same physical space between a PBS and the imager. The PBS separates the incoming illumination light from the polarization-rotated light from the imager. Due to new demands on PBSs, in part due to their new uses in applications such as, e.g., three-dimensional projection and imaging, a number of new issues have arisen. The present application provides articles that address such issues.

SUMMARY

In one aspect, the present description relates to a polarization subsystem. The polarization subsystem includes a first imager and a polarizing beam splitter. In some embodiments, the imager may be an LCOS imager. The polarizing beam splitter is made up in part of a reflective polarizer and receives imaged light from the imager. The reflective polarizer may be a multilayer optical film. In some embodiments, the reflective polarizer will have a surface roughness Ra of less than 45 nm or a surface roughness Rq of less than 80 nm. The polarizing beam splitter reflects imaged light towards a viewer or screen with an effective pixel resolution of less than 12 microns. In some embodiments, the polarizing beam splitter may reflect imaged light towards a viewer or screen with an effective pixel resolution of less than 9 microns, or less than 6 microns. The polarization subsystem may include a second imager, where the polarizing beam splitter receives imaged light from the second imager at a different face from that where it receives light from the first imager. The polarization subsystem may also include a projection lens that projects light from the polarizing beam splitter towards a viewer or screen. In some cases, the polarization subsystem may be part of a three-dimensional image projector.

In another aspect, the present description relates to a polarizing beam splitter. The polarizing beam splitter includes a reflective polarizer that is positioned between a first cover and a second cover. The reflective polarizer may be a multilayer optical film. The polarizing beam splitter is capable of reflecting imaged light towards a viewer or screen with an effective pixel resolution of less than 12 microns, and potentially less than 9 microns or less than 6 microns. The first and/or second covers of the polarizing beam splitter may be made, at least in part, of glass or suitable optical plastic. The first and/or second covers may be attached to the reflective polarizer by a suitable optical adhesive with additional processing, such as exposure to vacuum, to achieve the desired flatness of the multilayer optical film. The reflective polarizer may have a surface roughness Ra of less than 45 nm or a surface roughness Rq of less than 80 nm.

In yet another aspect, the present description relates to a projection subsystem. The projection subsystem includes a light source, a polarizing beam splitter, at least a first imager, and potentially a second imager. The polarizing beam splitter receives light from the light source and includes a reflective polarizer made up of a multilayer optical film. The first imager is positioned adjacent to the polarizing beam splitter. The second imager is positioned adjacent to the polarizing beam splitter on a different side of the polarizing beam splitter than the first imager. Light from the light source is incident upon the polarizing beam splitter and a first polarization of incident light is transmitted through the reflective polarizer while a second polarization of incident light orthogonal to the first polarization state is reflected by the reflective polarizer. Light of the second polarization travels from the polarizing beam splitter to the second imager and is imaged and reflected back towards the polarizing beam splitter. Light reflected from the second imager is transmitted through the polarizing beam splitter to an image plane. Light of the first polarization is transmitted through the polarizing beam splitter to the first imager and is imaged and reflected back towards the polarizing beam splitter. Light reflected from the first imager is reflected at the polarizing beam splitter towards an image plane with an effective pixel resolution of less than 12 microns. In at least some embodiments, light reflected from the first imager is reflected at the polarizing beam splitter towards an image plane with an effective resolution of less than 9 microns or less than 6 microns. The reflective polarizer may have a surface roughness Ra of less than 45 nm or a surface roughness Rq of less than 80 nm. The light source of the projection subsystem may be any suitable light source such as an arc lamp or an LED or LEDs.

In another aspect, the present description relates to a polarization subsystem. The polarization subsystem includes a first imager and a polarizing beam splitter. The polarizing beam splitter is made up in part of a reflective polarizer and receives imaged light from the imager. The reflective polarizer may be a multilayer optical film. The polarizing beam splitter reflects imaged light towards a viewer or screen. In some embodiments, the reflective polarizer has a surface roughness Ra of less than 45 nm or a surface roughness Rq of less than 80 nm. In some embodiments, the reflective polarizer has a surface roughness Ra of less than 40 nm or a surface roughness Rq of less than 70 nm. In some embodiments, the reflective polarizer has a surface roughness Ra of less than 35 nm or a surface roughness Rq of less than 55 nm.

In another aspect, a polarization subsystem includes a first imager and a polarizing beam splitter plate adapted to receive imaged light from the imager. The polarizing beam splitter plate includes a first substrate, a multilayer optical film reflective polarizer that is disposed on the first substrate, a first outermost major surface, and an opposing second outermost major surface that makes an angle of less than about 20 degrees with the first outermost major surface. The polarizing beam splitter plate reflects the received imaged light towards a viewer or a screen with the reflected imaged light having an effective pixel resolution of less than 12 microns.

In another aspect, a polarizing beam splitter plate includes a first substrate, a second substrate, a multilayer optical film reflective polarizer that is disposed between and adhered to the first and second substrates, a first outermost major surface, and an opposing second outermost major surface that makes an angle of less than about 20 degrees with the first outermost major surface. The polarizing beam splitter plate is adapted to reflect imaged light towards a viewer or screen with the reflected imaged light having an effective pixel resolution of less than 12 microns.

In another aspect, a projection subsystem includes a light source, a first imager that images light received from the light source, and a polarizing beam splitter plate that receives the imaged light from the first imager and includes a multilayer optical film reflective polarizer, a first outermost major surface, and an opposing second outermost major surface that makes an angle of less than about 20 degrees with the first outermost major surface. The polarizing beam splitter plate reflects the received imaged light towards an image plane with an effective pixel resolution of less than 12 microns.

In another aspect, a polarization subsystem includes a first imager, and a polarizing beam splitter plate that receives imaged light from the imager and includes a multilayer optical film reflective polarizer, a first outermost major surface, and an opposing second outermost major surface that makes an angle of less than about 20 degrees with the first outermost major surface. The polarizing beam splitter plate reflects the received imaged light towards a viewer or screen. The multilayer optical film reflective polarizer has a surface roughness Ra of less than 45 nm or a surface roughness Rq of less than 80 nm.

In another aspect, a method of producing a flat film includes the steps of providing a multilayer optical film, providing a temporary flat substrate, releasably attaching a first surface of the multilayer optical film to the temporary flat substrate, and providing a permanent substrate where the permanent substrate includes a first outermost major surface and an opposing second outermost major surface that makes an angle of less than about 20 degrees with the first outermost major surface. The method further includes the steps of attaching a second surface of the multilayer optical film to the permanent substrate, and removing the multilayer optical film from the temporary flat substrate.

In another respect, a method of creating an optically flat polarizing beam splitter plate, includes the steps of providing a multilayer optical film reflective polarizer, applying a layer of pressure sensitive adhesive to a first surface of the multilayer optical film, applying a first substrate against the pressure sensitive adhesive layer on the side opposite the multilayer optical film where the first substrate includes a first outermost major surface and an opposing second outermost major surface that makes an angle of less than about 20 degrees with the first outermost major surface, and applying vacuum to the pressure sensitive adhesive, the multilayer optical film, and the first substrate.

DETAILED DESCRIPTION

A high performance PBS is essential for creating a viable optical engine for a projector that uses Liquid Crystal on Silicon (LCOS) imagers. In addition, a PBS may be required even for nominally unpolarized imagers such as DLP imagers when such imagers are required to handle polarized light. Typically, a PBS will transmit nominally p-polarized light and reflect nominally s-polarized light. A number of different types of PBSs have been used, including MacNeille type PBSs and wire grid polarizers. However, PBSs based on multilayer optical film have proven to be one of the most effective polarizing beam splitters for issues associated with light handling in projection systems, including the ability to effectively polarize over a range of wavelengths and angles of incidence and with high efficiencies both in reflection and transmission. Such multilayer optical films are made by 3M Company, as described in U.S. Pat. No. 5,882,774 to Jonza et al., and U.S. Pat. No. 6,609,795 to Weber et al.

With the advent of a number of new imaging and projection applications, including, e.g., three-dimensional projection and imaging, new challenges have arisen. Specifically, in at least some three-dimensional imaging applications, it may be required that a PBS provide imaged light that has a high effective resolution (as defined below) not only when transmitted through a reflective polarizing film, but also when reflected by a reflective polarizing film. Unfortunately, polarizers based on multilayer optical film, despite their other major advantages, may be difficult to formulate with the requisite flatness to reflect imaged light at high resolution. Rather, where such multilayer film reflective polarizers are used to reflect imaged light, the reflected image may be distorted. However, the concerns of effectively polarizing a wide array of angles of incident light and wavelengths of incident light must still be addressed. It would therefore be highly desirable to provide a polarizing beam splitter that has the benefits of a PBS that contains multilayer optical film, while also achieving heightened effective resolution for imaged light reflected off of the PBS towards a viewer or screen. The present description provides such a solution.

Figure 1:
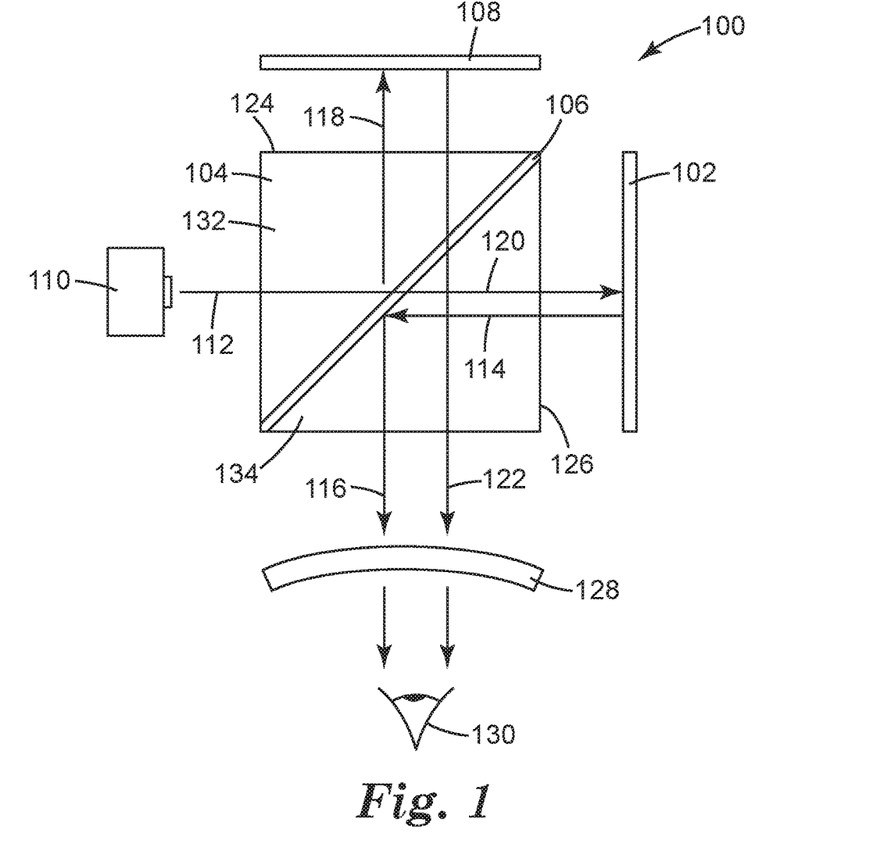
FIG. 1 is a polarization conversion system according to the present description.

FIG. 1 provides an illustration of one polarization subsystem according to the present description. Polarization subsystem includes a first imager 102. In a number of embodiments, such as that illustrated in FIG. 1, the imager will be an appropriate reflective imager. Often, imagers used in projection systems are typically polarization-rotating, image-forming devices, such as liquid crystal display imagers, which operate by rotating the polarization of the light to produce an image corresponding to digital video signals. Such imagers, when used in projection systems, typically rely on polarizers to separate light into a pair of orthogonal polarization states (e.g., s-polarization and p-polarization). Two common imagers that may be used in the embodiment shown in FIG. 1 include a liquid crystal on silicon (LCOS) imager, or digital light processing (DLP) imager. Those skilled in the art will recognize that the DLP system will require some modification to the illumination geometry as well as an external means of rotating the polarization (such as a retarder plate) in order to make use of the PBS configuration shown in FIG. 1. The polarization subsystem also includes a polarizing beam splitter (PBS) 104. Light 112 from a light source 110 travels towards PBS 104. Within PBS 104 is a reflective polarizer 106. The reflective polarizer may be a multilayer optical film such as those available from 3M Company (St. Paul, Minn.) and described in, e.g., U.S. Pat. No. 5,882,774 to Jonza et al., and U.S. Pat. No. 6,609,795 to Weber et al., each of which is hereby incorporated by reference in its entirety. When light 112 is incident upon film 106, one orthogonal polarization state of the incident light, such as the p-polarized state, will be transmitted through the film and exit the PBS as light 120 that is then incident on imager 102. The orthogonal polarization state of the incident light (in this case, s-polarized light), will be reflected by reflective polarizer 106 as a separate beam 118 in a different direction, here at right angles to beam 120.

Unimaged light of a given polarization state 120 is incident upon imager 102. The light is then imaged and reflected back towards PBS 104 and incorporated reflective polarizer 106. Where the imager 102 is an LCOS imager, and for those pixels in an "on" state, light 114 is also converted to an orthogonal polarization state. In this case, the p-polarized incident light, not yet imaged, is reflected as imaged light of s-polarization. When the s-polarized light is incident upon the polarizing beam splitter 104, and particularly multilayer optical film reflective polarizer 106, the light is reflected as s-polarized beam 116 towards a viewer or viewing screen 130. Imager 102 can be any type imager that may be desirable in an application. For example, imager 102 can be an LCOS imager, an OLED imager, a micro electro mechanical system (MEMS) imager, or a digital micromirror device (DMD) imager such as a DLP imager.

In a number of embodiments of the prior art, the imager may be positioned, e.g., in the direction towards which beam 118 travels. In such an embodiment imaged light would be transmitted through the polarizing beam splitter 104 rather than reflected in polarizing beam splitter 104. Transmitting imaged light through the polarizing beam splitter allows for less distortion of the image, and thus, higher effective resolution. However, as will be further explained, it may be desirable in a number of embodiments to include an imager 102 as positioned in FIG. 1. This may, for example, allow for overlapping images of different polarizations. Despite the many benefits of multilayer optical film as a reflective polarizer, it has conventionally been difficult to achieve high effective resolution for imaged light reflected off such films.

The Effective Resolution of the image or light produced by elements is a useful quantitative measurement because it helps predict what size pixel can be reliably resolved. Most current imagers (LCOS and DLP) have a pixel size range from about 12.5 µm down to around 5 µm. So in order to be useful in a reflective imaging situation, the reflector must be able to resolve down to at least about 12.5 µm, and ideally better. Therefore the Effective Resolution of a PBS must be no more than about 12.5 µm, and preferably lower. This would be considered a high effective resolution.

Using techniques described in the specification, one may in fact provide a multilayer optical film for use in a PBS 104 that can reflect imaged light at very high resolution. In fact, looking to FIG. 1, imaged light 116 may be reflected from the polarizing beam splitter 104 towards a viewer or viewing screen 130 with an effective pixel resolution of less than 12 microns. In fact, in some embodiments, the imaged light 116 may be reflected from the polarizing beam splitter 104 towards a viewer or viewing screen 130 with an effective pixel resolution of less than 11 microns, less than 10 microns, less than 9 microns, less than 8 microns, less than 7 microns, or potentially even less than 6 microns.

As discussed, in at least some embodiments, the polarization subsystem 100 may include a second imager 108. Second imager 108 may generally be of the same type of imager as first imager 106, e.g., LCOS or DLP. Light of one polarization state, such as s-polarized light, may be reflected from PBS 104, and specifically from reflective polarizer 106 of the PBS towards the second imager. It may then be imaged and reflected back towards PBS 104. Again, as with the first imager 104, light reflected off of second imager 108 is polarization converted, such that where s-polarized unimaged light 118 is incident upon imager 108, p-polarized imaged light 122 is redirected from the imager 108 back towards PBS 104. Whereas light 114 reflected from imager 102 is of a first polarization state (e.g., s-pol) and therefore reflects off of PBS 104 towards viewer or viewing screen 130, light reflected off of imager 108 (e.g. light 122) is of a second polarization (e.g., p-pol.) and therefore is transmitted through PBS 104 towards viewer or viewing screen 130. As can be seen from FIG. 1, the two imagers are located at different sides of the PBS 104, such that the PBS receives imaged light 114 from first imager 102 at a first face 126 and receives imaged light 122 from the second imager 108 at a second face 124 different from the first face.

Once imaged light 116 and potentially light 122 exits PBS 104 it is directed towards a viewer or viewing screen 130. In order to best direct light to the viewer and properly scale the image, light may be passed through a projection lens 128 or some sort of projection lens system. While only illustrated with a single element projection lens 128, polarization conversion system 100 may include additional imaging optics as needed. For example, the projection lens 128 may in fact be a plurality of lenses, such as lens group 250 of commonly owned and assigned U.S. Pat. No. 7,901,083. Note that in the case that optional imager 108 is not used, the input light 112 may be pre-polarized to have the same polarization state as light beam 120. This can be accomplished for example, by the use of a polarization converting system (PCS), the addition or a reflective or absorptive linear polarizer or other such device for enhancing the polarization purity of the input light stream 112. Such a technique may improve the overall efficiency of the system.

PBS 104 may include other elements besides reflective polarizer 106. For example, FIG. 1 illustrates a PBS 104 that also includes a first cover 132 and a second cover 134. Reflective polarizer 106 is positioned between first cover 132 and second cover 134, such that it is both protected and properly positioned by the covers. The first cover 132 and second cover 134 may be made of any appropriate material known in the art, such as glass, plastic or potentially other appropriate materials. It should be understood that additional materials and constructions may be applied to, e.g. the faces of the PBS or adjacent to and substantially coextensive with the reflective polarizer. Such other materials or constructions may include additional polarizers, dichroic filters/reflectors, retarder plates, anti-reflection coatings, lenses molded and/or bonded to the surface of the covers and the like.

Projection or polarization subsystems that emit light from different imagers, wherein the imaged light is of different polarizations may be especially useful as part of a three-dimensional image projector as described for example in U.S. Pat. No. 7,690,796 (Bin et al.). The distinct advantage of using a PBS based two imager system is that no time sequencing or polarization sequencing is required. This means that both imagers are operating at all times, effectively doubling the light output of the projector. As discussed, it is highly important that the reflective polarizer 106 be flat, such that the imaged light 116 reflected off of the polarizer is not distorted and has high effective resolution. Flatness can be quantified by the standard roughness parameters Ra (the average of the absolute value of the vertical deviation of the surface from the mean), Rq (the root mean squared average of the vertical deviation of the surface from the mean), and Rz (the average distance between the highest peak and lowest valley in each sampling length). Specifically, the reflective polarizer preferably has a surface roughness Ra of less than 45 nm or a surface roughness Rq of less than 80 nm, and more preferably has a surface roughness Ra of less than 40 nm or a surface roughness Rq of less than 70 nm, and even more preferably has a surface roughness Ra of less than 35 nm or a surface roughness Rq of less than 55 nm. One exemplary method of measuring the surface roughness or flatness of the film is provided in the Examples section below.

Figure 2:
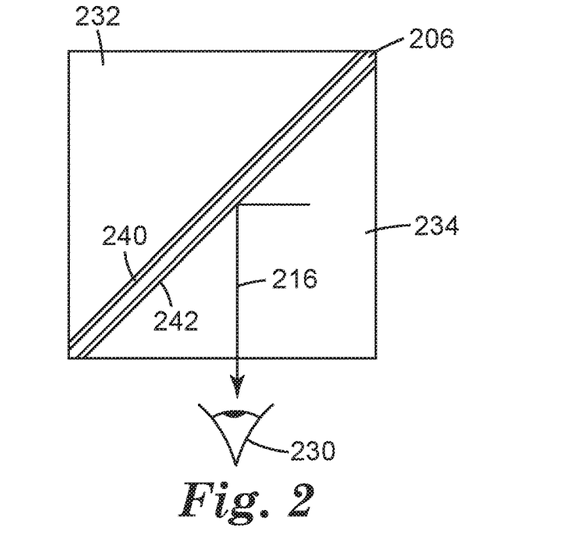
FIG. 2 is a polarizing beam splitter according to the present description.

In another aspect, the present description relates to a polarizing beam splitter. One such polarizing beam splitter 200 is illustrated in FIG. 2. Polarizing beam splitter 200 includes a reflective polarizer 206 that is positioned between a first cover 232 and a second cover 234. As with reflective polarizer 106 of FIG. 1, the reflective polarizer 206 of FIG. 2 is a multilayer optical film such as those described above. The polarizing beam splitter 200 is capable of reflecting imaged light 216 towards a viewer or surface 230. The effective pixel resolution of the imaged light 216 that is directed towards the viewer or surface is less than 12 microns, and possibly less than 11 microns, less than 10 microns, less than 9 microns, less than 8 microns, less than 7 microns, or potentially even less than 6 microns.

As with the covers of FIG. 1, first cover 232 and second cover 234 of PBS 200 may be made of any number of appropriate materials used in the field, such as glass or optical plastics, among others. In addition, the first cover 232, and second cover 234 may each be attached to reflective polarizer 206 by a number of different means. For instance, in one embodiment, the first cover 232 may be attached to the reflective polarizer 206 using a pressure sensitive adhesive layer 240. A suitable pressure sensitive adhesive is 3M™ Optically Clear Adhesive 8141 (available from 3M Company, St. Paul, Minn.). Similarly, the second cover 234 may be attached to the reflective polarizer using a pressure sensitive adhesive layer 242. In other embodiments, the first and second cover may be attached to reflective polarizer 206 using different adhesive types for layer 240 and 242. For example, layers 240 and 242 may be made up of a curable optical adhesive. Suitable optical adhesives may include optical adhesives from Norland Products Inc. (Cranbury, N.J.), such as NOA73, NOA75, NOA76 or NOA78, the optical adhesives described in commonly owned and assigned U.S. Patent Publication No. 2006/0221447 (to DiZio et al.) and commonly owned and assigned U.S. Patent Publication No. 2008/0079903 (to DiZio et al.), each of which is hereby incorporated by reference. UV curable adhesives may also be used. It should be understood that additional materials and constructions may be applied to, e.g. the faces of the PBS or adjacent to and substantially coextensive with the reflective polarizer. Such other materials or constructions may include additional polarizers, dichroic filters/reflectors, retarder plates, anti-reflection coatings, and the like. As with the PBS described in FIG. 1, the reflective polarizer 206 of FIG. 2 must be very flat to most effectively reflect imaged light 216 without distorting it. The reflective polarizer may have a surface roughness Ra of less than 45 nm or a surface roughness Rq of less than 80 nm. With typical application procedures of pressure sensitive adhesives such as described in U.S. Pat. No. 7,234,816 B2 (Bruzzone et al.) the required surface flatness of the reflective polarizer is not achieved. It has been discovered that certain types of postprocessing, allow the required surface flatness to be achieved.

Figure 3:
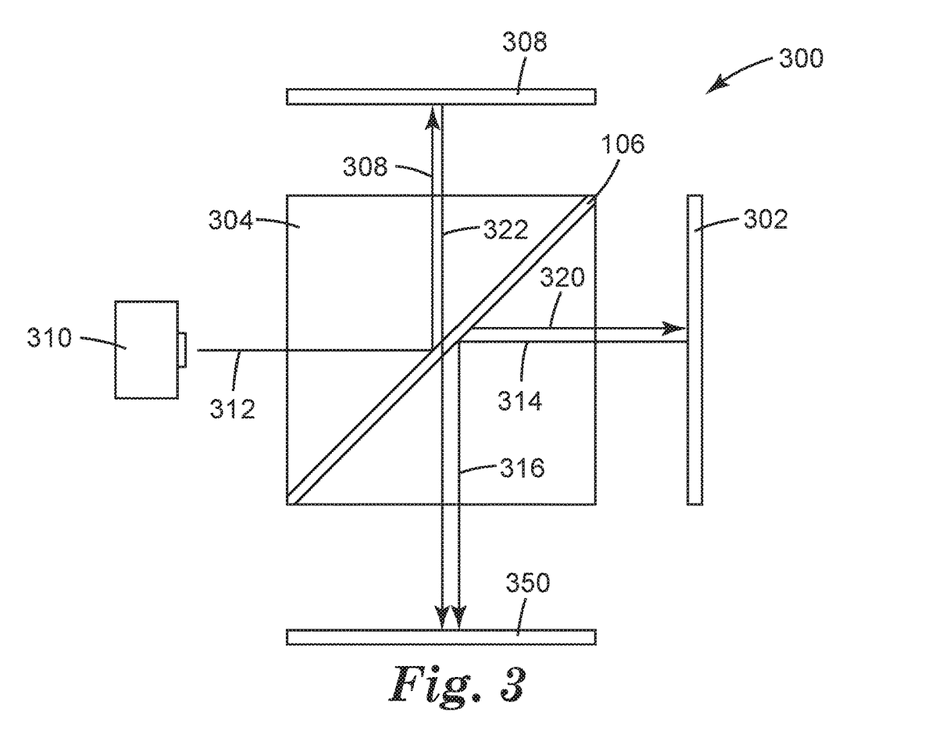
FIG. 3 is a projection subsystem according to the present description.

In yet another aspect, the present description relates to a projection subsystem. One such projection subsystem is illustrated in FIG. 3. Projection subsystem 300 includes a light source 310. Light source 310 may be any number of appropriate light sources commonly used in projection systems. For example, the light source 310 may be a solid-state emitter such as a laser or light emitting diode (LED) emitting light of a specific color such as red, green, or blue light. The light source 310 may also include a phosphor or other light converting material that absorbs light from the emissive source and re-emits light at other (generally longer) wavelengths. Suitable phosphors include well known inorganic phosphors such as Ce-doped YAG, strontium thiogallate, and doped silicate and SiAlON-type materials. Other light converting materials include III-V and II-VI semiconductors, quantum dots, and organic fluorescent dyes. Alternatively, the light source may be made up of a plurality of light sources, such as a red, a green and a blue LED, where such LEDs may be activated together or sequentially. Light source 310 may also be a laser light source, or potentially a traditional UHP lamp. It is to be understood that ancillary components such as color wheels, dichroic filters or reflectors and the like may additionally comprise light source 310.

The projection subsystem 300 further includes a polarizing beam splitter 304. Polarizing beam splitter 304 is positioned such that it receives light 312 from the light source. This incident light 312 may generally be made up in part of two orthogonal polarization states, e.g., part s-polarized light, and part p-polarized light. Within the polarizing beam splitter is a reflective polarizer 306, again in this case a multilayer optical film such as those described with respect to reflective polarizer 106. Light 312 is incident upon reflective polarizer 306 and light of one first polarization, e.g., p-polarized light is transmitted through as light 320 while light of a second orthogonal polarization, e.g. s-polarized light, is reflected as light 318.

Light of the first polarization 320 that is transmitted through the reflective polarizer 306 travels towards a first imager 302 that is positioned adjacent to the PBS 304. Light is imaged and reflected at the first imager 302 back towards PBS 304 with the polarization of the light converted. The converted imaged light 314 is then reflected at the PBS 304 as light 316 towards an image plane 350. The light 316 is reflected off of the reflective polarizer 306 of the PBS and reaches image plane 350 with an effective resolution of less than 12 microns, and possibly less than 11 microns, less than 10 microns, less than 9 microns, less than 8 microns, less than 7 microns, or potentially even less than 6 microns. The reflective polarizer 306 typically has a surface roughness Ra of less than 45 nm or a surface roughness Rq of less than 80 nm.

Light of the second polarization (e.g. s-polarized) light that is reflected initially by the reflective polarizer of PBS 304 travels as light 318 towards a second imager 308. Second imager 308 is also positioned adjacent the PBS 304, as with first imager 302, but second imager is positioned on a different side of the PBS. The incident light 318 is imaged and reflected back towards PBS 304. Upon reflection from the imager, the polarization of this light is rotated as well by 90 degrees (e.g. from s-polarized light to p-polarized light). The imaged light 322 is transmitted through the PBS 304 to the image plane 350. The first imager 302 and second imager 308 may be any appropriate type of reflective imager, such as those described above with respect to elements 102 and 108 of FIG. 1.

As discussed, in order to achieve high effective resolution for imaged light reflected off of the PBS herein, the reflective polarizer of the PBS must be exceptionally optically flat. The present description now provides methods of producing an optically flat reflective polarizer that is a multilayer optical film and/or methods of producing an optically flat polarizing beam splitter.

Figure 4:
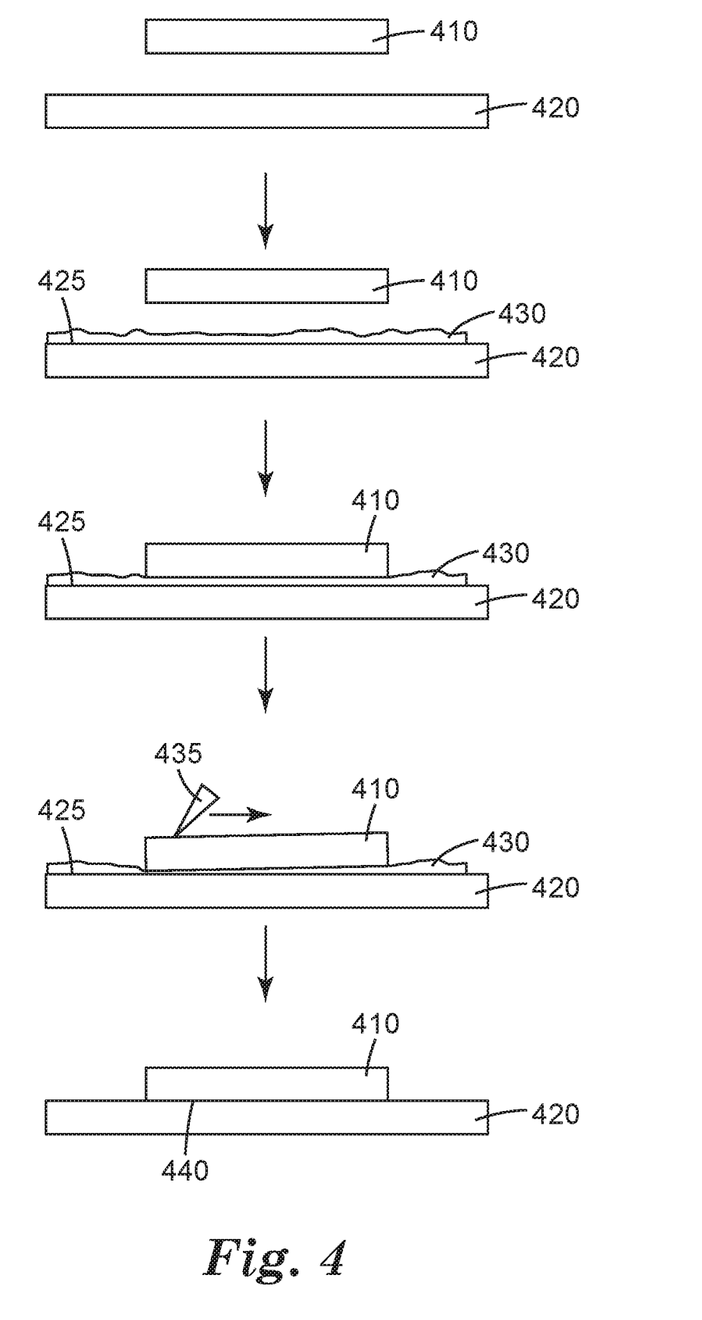
FIG. 4 is a flowchart illustrating a method of making a flat multilayer optical film for use in a PBS.

One such method is illustrated in the flowchart of FIG. 4. The method begins with providing a multilayer optical film 410, and providing a flat substrate 420. The multilayer optical film 410 may be similar to the multilayer optical films described with respect to the articles above. The flat substrate may be any number of appropriate materials, such as acrylic, glass or other appropriate plastics. Most importantly, the substrate 420 must possess at least the same degree of optical flatness as is required in the polarizing beam splitter and must allow a wetting solution to spread over its surface. Therefore, other plastics, inorganic glasses, ceramics, semiconductors, metals or polymers may be appropriate materials. Additionally it is useful for the substrate to be slightly flexible.

In the next step, the surface 425 of the flat substrate is releasably attached to a first surface of the multilayer optical film. In at least one embodiment, in order to create a releasable attachment, either the surface 425 of the flat substrate, or a first surface of the multilayer optical film, or both is wetted with a wetting agent, resulting in a thin layer of solution 430. A suitable wetting agent should have a surface energy that is sufficiently low that it will wet out the substrate or the film and a vapor pressure that is sufficiently high that it can evaporate at room temperature. In some embodiments, isopropyl alcohol is used as the wetting agent. In at least some embodiments the wetting agent will be an aqueous solution that contains at least a small amount of surfactant (e.g. less than 1% by volume). The surfactant may be common commercially available industrial wetting agents, or even household materials such as dishwashing detergent. Other embodiments may be aqueous mixtures of compounds that leave no residue upon evaporation such as ammonia, vinegar, or alcohol. The wetting agent may be applied by a number of appropriate methods including spraying, e.g., from a spray bottle. In the next step, the multilayer optical film is applied to the surface of the substrate 425 such that the solution 430 is sandwiched between the film and substrate. Typically the wetting agent is applied to the contacting surface of the multilayer optical film also. A pressure applying instrument 435, such as a squeegee is then drawn across the top of multilayer optical film 410 closely flattening optical film 410 to the surface 425 of substrate 420, and leaving only a thin, fairly uniform layer of solution 430 separating the two. In at least some embodiments, a protective layer may first be applied to the multilayer optical film on the side opposite the surface 440 that is applied to the substrate 420. At this point, the construction is left to allow the solution 430 to evaporate. The squeegeeing process pushes residual water past the edges of the multilayer optical film such that only a small amount remains. Next, the multilayer optical film, flat substrate, and wetting agent are allowed to dry. With time, all of the volatile components of the wetting solution evaporate either through layers 410 or 420 or by wicking along the space between layers 410 and 420 to the edges of layer 410 where evaporation can occur. As this process occurs, the multilayer optical film 410 is drawn closer and closer to substrate 420 until layer 410 closely conforms to the surface 425. The result is shown in the next step of FIG. 4, as the drying closely draws the film 410 to substrate 420 and effectively flattens the bottom surface 440 of the multilayer optical film. Once this flatness has been achieved, the multilayer optical film 410 remains stably flat but releasably attached to the substrate. At this point a permanent substrate may be adhered to the exposed surface of the film 410.

Figure 5:
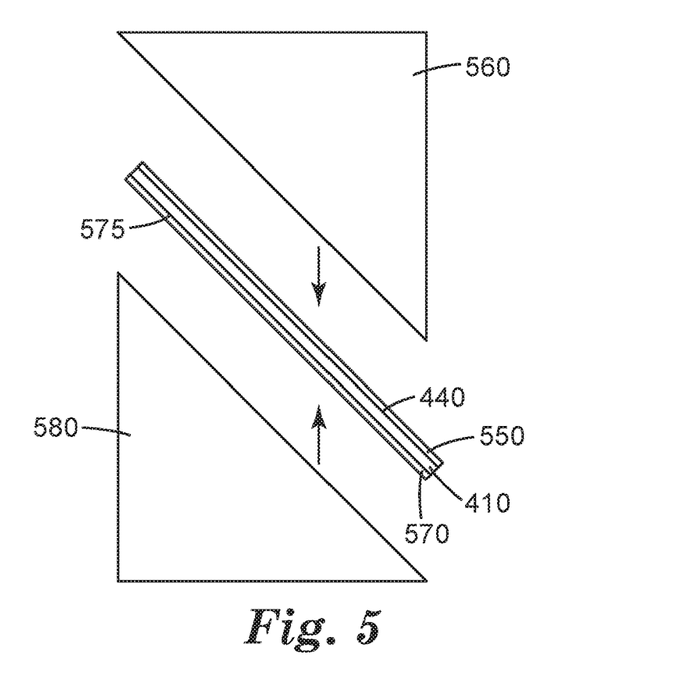
FIG. 5 illustrates a method for creating a polarizing beam splitter using a multilayer optical film.

FIG. 5 illustrates further steps that may be taken in providing a final construction of a polarizing beam splitter. For example, an adhesive 550 may be applied on the flattened surface 450 of film 410. The adhesive may be any appropriate adhesive that does not adversely affect the optical or mechanical performance of the PBS. In some embodiments, the adhesive may be a curable optical adhesive, such as NOA73, NOA75, NOA76 or NOA78 from Norland Products Inc. (Cranbury, N.J. In other embodiments, optical epoxies may be used. In some embodiments, the adhesive may be a pressure sensitive adhesive. Next, one may provide a permanent second substrate. In one embodiment, the permanent second substrate may be a prism. As shown in FIG. 5, Prism 560 is applied against the adhesive 550 and the construction is cured if appropriate. The film 410 may now be removed from the substrate 420. In at least one embodiment, the film 410 is peeled away from substrate 420, typically by flexing substrate 420 slightly to allow the film 410 to release from substrate 420. For cured adhesives such as UV adhesives or epoxies the newly exposed bottom surface of the film 440 retains the flatness of the substrate 420. For pressure sensitive adhesives, the bottom surface of the film 440 may retain the flatness of the substrate 420 or may require additional processing to maintain the flatness. Once the flat film surface 440 has been achieved a second layer of adhesive 570 may be applied to the bottom surface of the film 440 and a second prism or other permanent substrate 580 may be applied to the adhesive. Again the construction may be cured as needed, resulting in a complete polarizing beam splitter.

Another method of making an optically flat polarizing beam splitter includes the use, specifically, of pressure sensitive adhesives. With appropriate techniques, the multilayer optical film may be made to conform closely to the flat surface of the prism. The following steps may be included. First, a multilayer optical film is provided. The multilayer optical film will act as a reflective polarizer. This may be similar to reflective polarizer optical film 410 of FIG. 5 with the exception that the surface 440 may not be substantially flattened already through the steps shown in FIG. 4. A layer of pressure sensitive adhesive (here corresponding to adhesive layer 550) may be applied to the first surface 440 of the multilayer optical film. Next a prism 560 may be applied against the pressure sensitive adhesive layer adhesive layer on the side opposite the multilayer optical film 410. The method may also include applying a second layer of adhesive (e.g. layer 570) on a second surface 575 of the film opposite first surface 440. A second prism 580 may then be applied to the opposite side of layer 570 from film 410. The present method provides an improvement over this method that further enhances the flatness of the reflective polarizer/prism interface, such that imaged reflection off of the PBS has enhanced resolution. After pressure sensitive adhesive 550 is applied between the prism 560 and multilayer optical film 410, the construction is subjected to vacuum. This may occur, for example, by placing the construction in a vacuum chamber equipped with a conventional vacuum pump. The vacuum chamber may be lowered to a given pressure, and the sample may be held at that pressure for a given amount of time, e.g., 5-20 minutes. When air is re-introduced to the vacuum chamber, the air pressure pushes the prism 560 and multilayer optical film 410 together. Where a second adhesive layer and second prism are also applied, the subjection to vacuum in the chamber may optionally be repeated for the second interface (e.g. at layer 570). Applying vacuum to a prism/MOF assembly results in a PBS that provides heightened effective resolution when imaged light is reflected off of the PBS. In place of or in conjunction with the vacuum treatment, a thermal/pressure treatment may also be used. It may be advantageous to conduct the processing more than one time.

EXAMPLES

The following list of materials and their source is referred to throughout the Examples. If not otherwise specified, materials are available from Aldrich Chemical (Milwaukee, Wis.). Multilayer Optical Films (MOFs) were generally prepared according to methods described in, for example, U.S. Pat. No. 6,179,948 (Merrill et al); U.S. Pat. No. 6,827,886 (Neavin et al); 2006/0084780 (Hebrink et al); 2006/0226561 (Merrill et al.); and 2007/0047080 (Stover et al.).
Roughness Measurement Method
Prisms were placed on modeling clay and leveled using a plunger leveler. Topographic maps were measured with a Wyko® 9800 optical interferometer (available from Veeco Metrology, Inc., Tucson, Ariz.), with a 10× objective and 0.5× field lens and with the following settings: VSI detection; 4 mm×4 mm scan area stitched using 6 rows and 5 columns of individual maps, 2196×2196 pixels with a sampling of 1.82 μm; tilt and sphere correction used; 30-60 microns back scan length with 60-100 forward scan length; with the modulation detection threshold 2%. Autoscan detection was enabled at 95% with 10 μm post scan length (this short post scan length avoided subsurface reflections in the data collection).
A 4 mm×4 mm area in the central region of the hypotenuse-face of each prism was measured. Specifically, the topography of each region was measured, plotted, and the roughness parameters Ra, Rq and Rz were calculated. One measurement area was obtained per prism. Three prism samples were measured in each case and the mean and standard deviation of the roughness parameters were determined.

Example 1: Wet Application Method

A reflective polarizing multilayer optical film (MOF) was releasably disposed onto an optically flat substrate in the following manner. First a wetting solution comprising approximately 0.5% mild dishwashing detergent in water was placed into a spray bottle. A sheet of approximately 6 mm high-gloss acrylic was obtained and the protective layer removed from one side in a clean hood. The exposed acrylic surface was sprayed with the wetting solution so that the entire surface was wet. Separately a piece of MOF was obtained and one of its skin layers was removed in a clean hood. The exposed surface of the MOF was sprayed with the wetting solution, and the wet surface of the MOF was contacted with the wet surface of the acrylic sheet. A heavy release liner was applied to the surface of the MOF to prevent damage to the MOF, and a 3M™ PA-1 applicator (available from 3M Company, St. Paul, Minn.) was used to squeegee the MOF down to the surface of the acrylic. This resulted in most of the wetting solution being expelled from between the two wetted surfaces. After this was done the second skin layer from the MOF was removed. Inspection of the applied MOF showed that the MOF surface was much more irregular than the surface of the acrylic. Upon inspection again after 24 hours, the MOF surface was observed to be comparable in flatness to the acrylic sheet. This observed flattening over time is consistent with residual wetting solution evaporating from between the two surfaces allowing the MOF to conform closely to the surface of the acrylic. Even though the MOF conformed closely and stably to the surface of the acrylic, it could be easily removed by peeling the MOF from the surface of the acrylic.
An imaging PBS was prepared by placing a small amount of Norland Optical Adhesive 73 (available from Norland Products, Cranbury, N.J.) onto the surface of the MOF. The hypotenuse of a 10 mm 45° BK7 polished glass prism was slowly placed into contact with the adhesive so that no bubbles were entrained in the adhesive. The amount of adhesive was chosen so that when the prism was placed on to the adhesive, there was sufficient adhesive to flow out to the edges of the prism, but not so much adhesive to cause substantial overflow of the adhesive beyond the perimeter of the prism. The result was that the prism was substantially parallel to the surface of the MOF and separated by a layer of adhesive of approximately uniform thickness.
A UV curing lamp was used to cure the adhesive layer through the prism. After curing, a section of the MOF that was larger than the prism and that contained the prism was peeled away from the acrylic substrate. Removal was facilitated by bending the acrylic plate, thereby allowing the rigid prism and MOF composite to separate more easily from the acrylic plate. Inspection of the prism/MOF composite showed that the MOF retained its flatness despite being removed from the acrylic plate.
The roughness parameters of the MOF were then measured as described under "Roughness Measurement Method" and are reported in the following table.

|  | average | stdev |
| --- | --- | --- |
| Ra (nm) | 34 | 12 |
| Rq (nm) | 51 | 30 |
| Rz (μm) | 6.7 | 8.5 |

A small amount of the Norland optical adhesive was applied to the MOF surface on the prism/MOF composite. A second 10 mm 45° prism was procured and its hypotenuse placed in contact with the adhesive. The second prism was aligned such that its principal and secondary axes were substantially parallel to those of the first prism, and the two hypotenuse surfaces were substantially coextensive. A UV curing lamp was used to cure the adhesive layer so that the second 45° prism was bonded to the prism/MOF composite. The resulting configuration was a polarizing beam splitter.

Example 2: PSA Method Using Heat and Pressure

An adhesive construction was formed by taking a sample of 3M™ Optically Clear Adhesive 8141 (available from 3M Company, St. Paul, Minn.) and laminating it to a reflective polarizing MOF using a roll lamination process. A piece of this adhesive construction was adhered to the hypotenuse of a glass prism similar to that used in Example 1. The resulting MOF/prism composite was placed into an autoclave oven and processed at 60° C. and 550 kPa (80 psi) for two hours. The sample was removed and a small quantity of thermally curable optical epoxy was applied to the MOF surface of the MOF/prism composite. The prisms were aligned as in Example 1. The sample was then returned to the oven and again processed at 60° C. and 550 kPa (80 psi), this time for 24 hours. The resulting configuration was a polarizing beam splitter.

Example 2A: Roughness Resulting From PSA Method Using Heat and Pressure

The roughness of MOF produced using the method of Example 2 was determined as follows. A piece of MOF measuring 17 mm×17 mm was laminated using a hand roller to a glass cube having a width of 17 mm. The glass cube had a flatness of about 0.25 lambda, where lambda equaled 632.80 nm (a reference wavelength of light). The roll-laminated MOF was annealed in an autoclave oven at 60° C. and 550 kPa (80 psi) for two hours. A Zygo Interferometer (available from Zygo Corporation, Middlefield Conn.) was used to measure the flatness of the roll-laminated MOF using light having a wavelength of lambda=632.80 nm. The Zygo Interferometer reported a peak to valley roughness, where a tilt correction was used and no sphere correction was applied. The peak to valley roughness measured over the 17 mm×17 mm area was determined to be 1.475 lambda or about 933 nm.

Example 3: PSA Method Using Vacuum

A piece of the adhesive construction of Example 2 was adhered to a glass prism in a manner similar to that in Example 2. The resulting prism/MOF composite was placed into a vacuum chamber equipped with a conventional vacuum pump. The chamber was evacuated to around 71 cm (28 inches) of Hg, and of the sample held under vacuum for about 15 minutes.

The sample was removed from the vacuum chamber and the roughness parameters of the MOF were measured as described under "Roughness Measurement Method." and the measured values are reported in the following table.

|  | average | stdev |
| --- | --- | --- |
| Ra (nm) | 32 | 3 |
| Rq (nm) | 40 | 5 |
| Rz (μm) | 1.2 | 0.7 |

A second prism was attached to the prism/MOF composite using the technique and the UV optical adhesive of Example 1. The resulting configuration was a polarizing beam splitter.

Example 4

The film of Example 3 was bonded to a transparent glass substrate having a 7 mm width, a 10 mm length, and a 181 micron thickness. The film was adhered to the glass substrate using 3M™ Optically Clear Adhesive 8141 (available from 3M Company, St. Paul, Minn.). The adhesive thickness was 12.5 microns. The glass substrate and film laminate was passed through a roller nip. Next, the laminate was bonded to a substrate at a 45 degree angle such that the reflected polarization was parallel to the substrate, and the transmitted polarization had a nominal incidence angle of 45 degrees. An MPro 120 picoprojector (also available from 3M Company) was modified such that light from the illumination source of the projector passed straight through the laminate to the LCoS imager of the projector with the film side of the laminate facing the LCOS imager, and light selected by the imager was reflected at a 90 degree angle.

Comparative Example C-1

A polarizing beam splitter configuration was created according to U.S. Pat. No. 7,234,816 (Bruzzone et al.). A piece of the adhesive construction of Example 2 was adhered to a glass prism using a hand roller thereby forming an MOF/prism composite.

The roughness parameters of the MOF were then measured as described under "Roughness Measurement Method" and are reported in the following table.

|  | average | stdev |
| --- | --- | --- |
| Ra (nm) | 65 | 20 |
| Rq (nm) | 100 | 18 |
| Rz (μm) | 8.6 | 5.1 |

A second prism was attached to the prism/MOF composite using the technique and the UV optical adhesive of Example 1. The resulting configuration was a polarizing beam splitter.

Performance Assessment

The polarizing beam splitters of Example 1, 2, 3 and Comparative Example C-1 were assessed for their ability to reflect an image using a resolution test projector. A reference reflector consisting of one of the 45° prisms used in the other examples and operating as a total internal reflection (TIR) reflector was used to establish the best possible performance for the test projector.

A test target with 24× reduction was back illuminated with an arc lamp light source. Attached to the front surface of the test target was a 45° prism, identical to those used in earlier examples (and herein called the illumination prism). Light from the test target, traveling horizontally from the source through the test target, entered one face of the illumination prism, reflected off of the hypotenuse (via TIR) and exited the second face of the prism. The second face of the prism was oriented such that the exiting light was directed vertically. The various PBSs from the examples, as well as the reference prism were placed on top of the second face of the illumination prism. The reflecting surface (MOF) in the PBSs as well as the hypotenuse from the reference prism were oriented such that the light reflecting from the MOF or the hypotenuse of the reference prism were directed forward and horizontal. An F/2.4 projection lens obtained from a 3M™ SCP 712 digital projector (available from 3M Company, St. Paul, Minn.) was placed at the exit surface of the PBS or the reference prism and focused back onto the test target, forming a kind of "periscope" layout.

This optical system was then used to assess the ability of each different PBS to resolve a test target while operating in a reflection mode. In the system, an approximately 5 mm×5 mm portion of the test target was projected to about 150 cm (60 inches) diagonal. Within this area of the test target were multiple repeats of the resolution images. Five different identical repeats of the test target were assessed in different locations of the projected image: Top Left, Bottom Left, Center, Top Right and Bottom Right. Each test target was assessed to determine the highest resolution that was clearly resolved. According to the protocol, the maximum resolution was required to be resolved as well as all resolutions below that level. There were instances where localized distortions caused lower resolutions to not be resolved even though higher resolutions (in a slightly different location) were resolved. The reason for this choice is that the full field and not just small areas must be resolved in order for the PBS to function effectively in a reflective mode.

Multiple samples of each Example were tested. Once the maximum resolutions were established for each location on each PBS, an average and a standard deviation were computed for each type of prism (that is, for Examples 1-3, Comparative Example C-1 and the Reference prism.) An "Effective Resolution" was defined as the average minus two standard deviations. This metric was determined from the data in "line pairs/mm" (lp/mm) and then expressed in terms of the size of the smallest resolvable pixel which was determined as ½ of the inverse of the Effective Resolution expressed in lp/mm. This definition accounts for the fact that the resolution is only as good as the minimum resolution across the field. The Effective Resolution represents the maximum resolution that the particular PBS set can be expected to reliably (across 95% of the image) resolve.

Table 1 shows the results of the measurements of the different Examples within this disclosure and Table 2 shows the resulting Effective Resolution. As can be seen, the reference sample can resolve a 5 µm pixel. The PBS from Example 1 can also resolve a very nearly 5 µm pixel. Example 2 is able to resolve down to at least 12 µm and the PBS from Example 3 can resolve down to 7 µm. All of these constructions should be adequate for at least some reflective imaging applications. On the other hand, the PBS from Comparative Example C-1 is limited to resolving around 18 micron pixels, and would likely not be a robust choice for a reflective imaging construction.

TABLE 1

Line Pairs/mm at Five Locations for Samples

| Example | Sample | Top Right (lp/mm) | Bottom Right (lp/mm) | Center (lp/mm) | Bottom Left (lp/mm) | Top Left (lp/mm) |
|---|---|---|---|---|---|---|
| Reference | A | 170.4 | 170.4 | 108.0 | 192.0 | 170.4 |
| 1 | B | 151.2 | 170.4 | 120.0 | 151.2 | 120.0 |
| 1 | C | 151.2 | 151.2 | 108.0 | 120.0 | 151.2 |
| 1 | D | 151.2 | 151.2 | 108.0 | 134.4 | 120.0 |
| 2 | E | 151.2 | 134.4 | 60.0 | 108.0 | 86.4 |
| 2 | F | 134.4 | 134.4 | 67.2 | 96.0 | 96.0 |
| 2 | G | 134.4 | 134.4 | 96.0 | 60.0 | 76.8 |
| 3 | H | 134.4 | 134.4 | 96.0 | 86.4 | 120.0 |
| 3 | I | 134.4 | 151.2 | 108.0 | 96.0 | 96.0 |
| C-1 | J | 151.2 | 134.4 | 48.0 | 60.0 | 76.8 |
| C-1 | K | 120.0 | 134.4 | 60.0 | 96.0 | 60.0 |
| C-1 | L | 120.0 | 120.0 | 60.0 | 86.4 | 86.4 |
| C-1 | M | 134.4 | 120.0 | 60.0 | 60.0 | 86.4 |

TABLE 2

Effective Resolution of Exemplary Film

| Example | Average (lp/mm) | Std. Dev. (lp/mm) | Effective Resolution (lp/mm) | Effective Resolution (µm) |
|---|---|---|---|---|
| Reference | 162.2 | 31.7 | 98.8 | 5.06 |
| 1 | 137.3 | 19.6 | 98.1 | 5.10 |
| 2 | 104.6 | 30.9 | 42.9 | 11.65 |
| 3 | 115.7 | 22.1 | 71.4 | 7.00 |
| C-1 | 93.7 | 32.8 | 28.2 | 17.74 |

In some cases, the polarizing beam splitter is in the form of a plate having opposing parallel or near parallel major surfaces. Such beam splitter plates are thin and have flat outermost and internal major surfaces that can lead to high contrast and high resolution images projected onto an image play and/or displayed to a viewer. The polarizing beam splitters include a multilayer optical film reflective polarizer bonded to one or more thin optically transparent substrates. The transparent substrate may be an inorganic material such as glass, or an organic material such as a polymer, or a combination of an inorganic and organic material.

Figure 6:
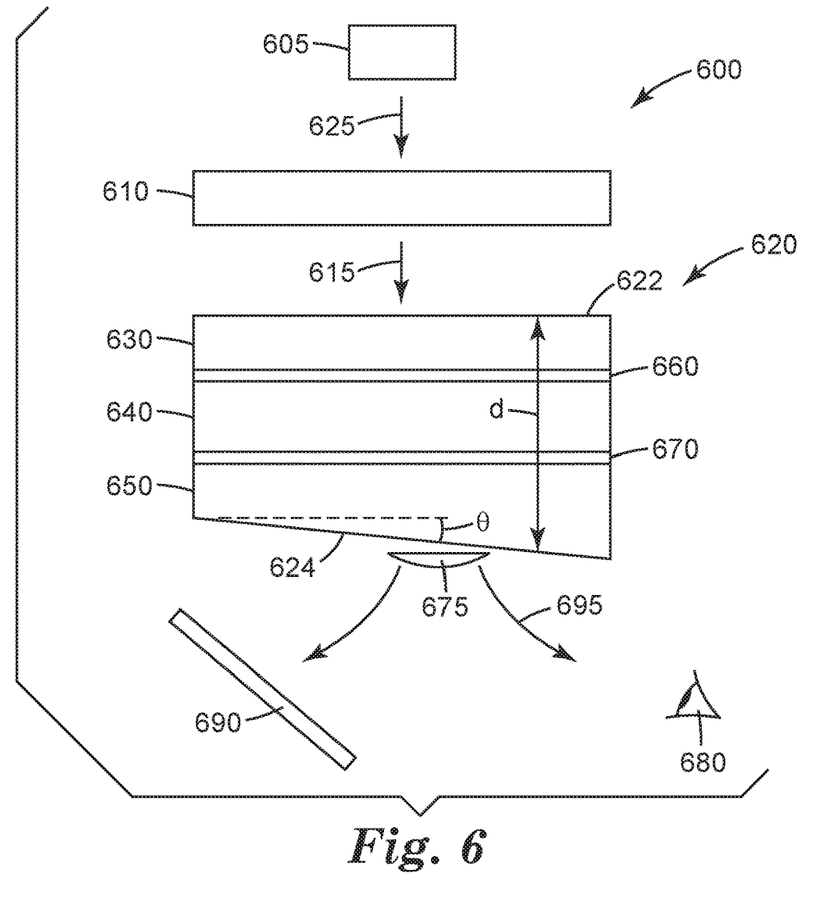
FIG. 6 is a schematic view of a polarization subsystem.

FIG. 6 is a schematic view of a polarization subsystem 600 that includes a light source 605, a first imager 610 and a polarizing beam splitter plate 620. Light source 605 emits light 625 that illuminates and is received by first imager 610. First imager 610 modulates the received light and emits an imaged light 615 that is received by polarizing beam splitter plate 620. The polarizing beam splitter plate reflects the received imaged light as reflected light 695 towards a viewer 680 or screen 690. Polarizing beam splitter plate 620 includes a first substrate 630, a multilayer optical film reflective polarizer 640 disposed on the first substrate, and second substrate 650 disposed on the multilayer optical film reflective polarizer 640 so that multilayer optical film reflective polarizer 640 is disposed between first and second substrates 630 and 650. Multilayer optical film reflective polarizer 640 is bonded or adhered to first and second substrates 630 and 650 via respective adhesive layers 660 and 670, where each of the two adhesive layers can be or include any adhesive disclosed herein. For example, in some cases, one or both adhesive layers 660 and 670 can be or include a pressure sensitive adhesive, a UV cured adhesive, or an optical epoxy. Polarizing beam splitter plate 620 includes a first outermost major surface 622 and an opposing second outermost major surface 624 that makes an angle θ with major surface 622, where angle θ is less than about 20 degrees, or less than about 15 degrees, or less than about 10 degrees, or less than about 7 degrees, or less than about 5 degrees, or less than about 3 degrees, or less than about 2 degrees, or less than about 1 degree.

Figure 7:
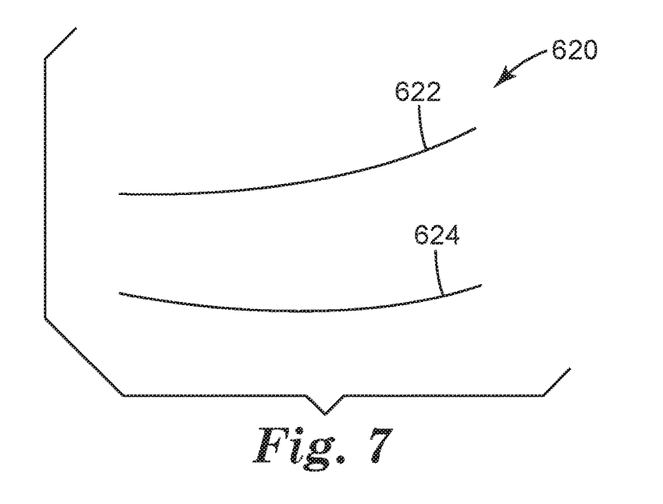
FIG. 7 is a schematic view of the outermost surfaces of a polarizing beam splitter plate.

Reflected light 695 propagating toward viewer 680 or screen 690 has an effective pixel resolution of less than 15 microns, or less than 12 microns, or less than 10 microns, or less than 9 microns, or less than 8 microns, or less than 7 microns, or less than 6 microns, or less than 5 microns, or less than 4 microns. In some cases, polarizing beam splitter plate 620 is thin. In such cases, a maximum separation d between the first and second outermost major surfaces 622 and 624 is less than about 2 mm, or less than about 1.75 mm, or less than about 1.5 mm, or less than about 1.25 mm, or less than about 1 mm, or less than about 0.75 mm, or less than about 0.5 mm. In some cases, first and second outermost major surfaces 622 and 624 are planar. In some cases, at least one of first and second outermost major surfaces 622 and 624 is non-planar. For example, in some cases, at least one of first and second outermost major surfaces 622 and 624 includes a curved portion, or is concave, or convex, as generally shown schematically in FIG. 7. In some cases, at least one of first and second outermost major surfaces 622 and 624 curves away from or toward polarizing beam splitter plate 620.

Each of substrates 630 and 650 can be any type substrate that may be desirable in an application. For example, substrates 630 and 650 can include glass or a polymer. Substrates 630 and 650 can each be a single layer meaning that there are no embedded or internal major interfaces within the substrates. In some cases, at least one of first and second substrates 630 and 650 can include two or more layers. In some cases, substrates 630 and 650 are optically isotropic meaning that the substrates have substantially equal indices of refraction along three mutually orthogonal directions. In some cases, substrates 630 and 650 have very low light scattering properties. For example, in such cases, each of substrates 630 and 650 has a diffuse transmission of less than about 5%, or less than about 4%, or less than about 3%, or less than about 2%, or less than about 1%, or less than about 0.5%. As used herein, diffuse transmission refers to light that is transmitted outside a 2 degree half-angle cone for collimated normal light incidence. First imager 605 can be any first imager disclosed herein that may be desirable in an application.

For example, in some cases, first imager 605 can include or be an LCOS imager. In some cases, polarization subsystem 600 includes a projection lens 675 that receives light from polarizing beam splitter plate 620 after light is imaged and projects it towards the viewer or screen as light 695. In some cases, multilayer optical film reflective polarizer 620 has a surface roughness Ra of less than 45 nm or a surface roughness Rq of less than 80 nm, or a surface roughness Ra of less than 40 nm or a surface roughness Rq of less than 70 nm, or a surface roughness Ra of less than 35 nm or a surface roughness Rq of less than 55 nm.

Polarization subsystem 600 can be incorporated into any system that may be desirable in an application. For example, in some cases, a three-dimensional image projector includes the polarization subsystem 600. Light source 605 can be or include any type light source disclosed herein. In some cases, light source 605 includes one or more LEDs. In some cases, a projection system includes projection subsystem 600 and first imager 610 is pixelated and includes a plurality of pixels. The pixels can form a regular array of pixels forming rows and columns of pixels. The projection system projects images of the pixels in the plurality of pixels onto a screen. Each pixel has an expected location on the screen, an expected area on the screen, an actual location on the screen, and an actual area on the screen. In some cases, the actual location of each pixel on the screen is within a circle that is centered on the expected location of the pixel and has an actual area that is less than 100 times, or less than 75 times, or less than 50 times, or less than 25 times, or less than 15 times, or less than 10 times, or less than 5 times, or less than 2 times, the expected area of the pixel. In some cases, the actual area of the projected pixel on the screen is less than 10 times, or less than 7 times, or less than 5 times, or less than 3 times, or less than 2 times, the expected area of the projected pixel on the screen.

Figure 8:
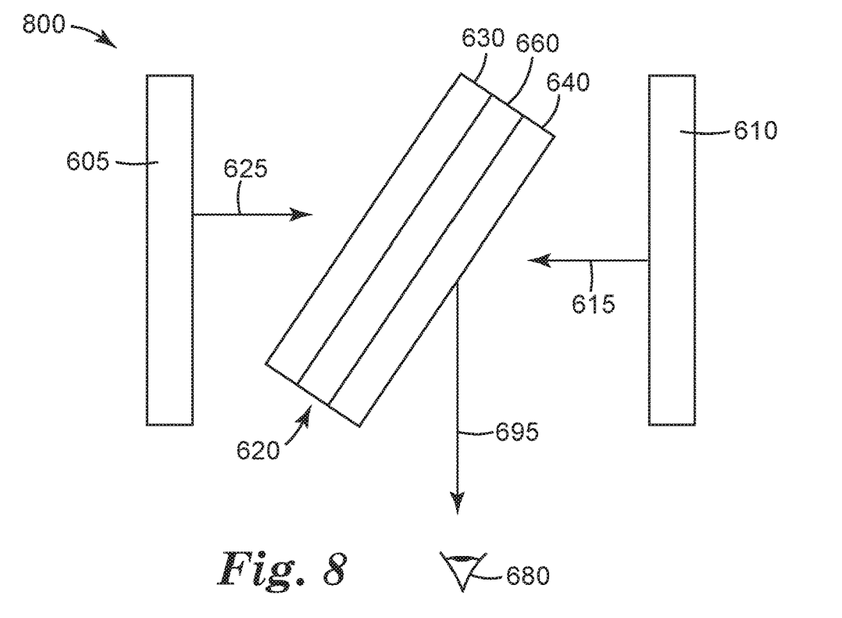
FIG. 8 is a schematic view of a reflective-type imaging system.
Figure 9:
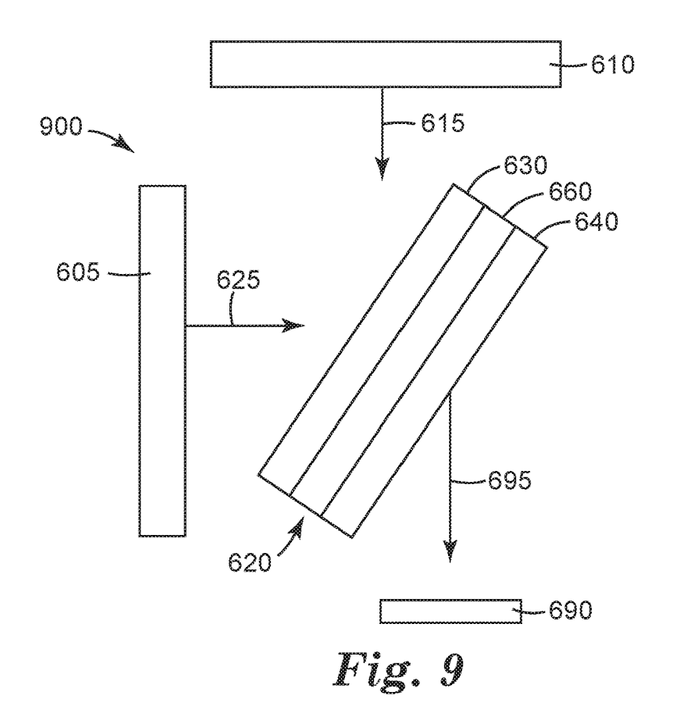
FIG. 9 is a schematic view of a transmissive-type imaging system.
Figure 10:
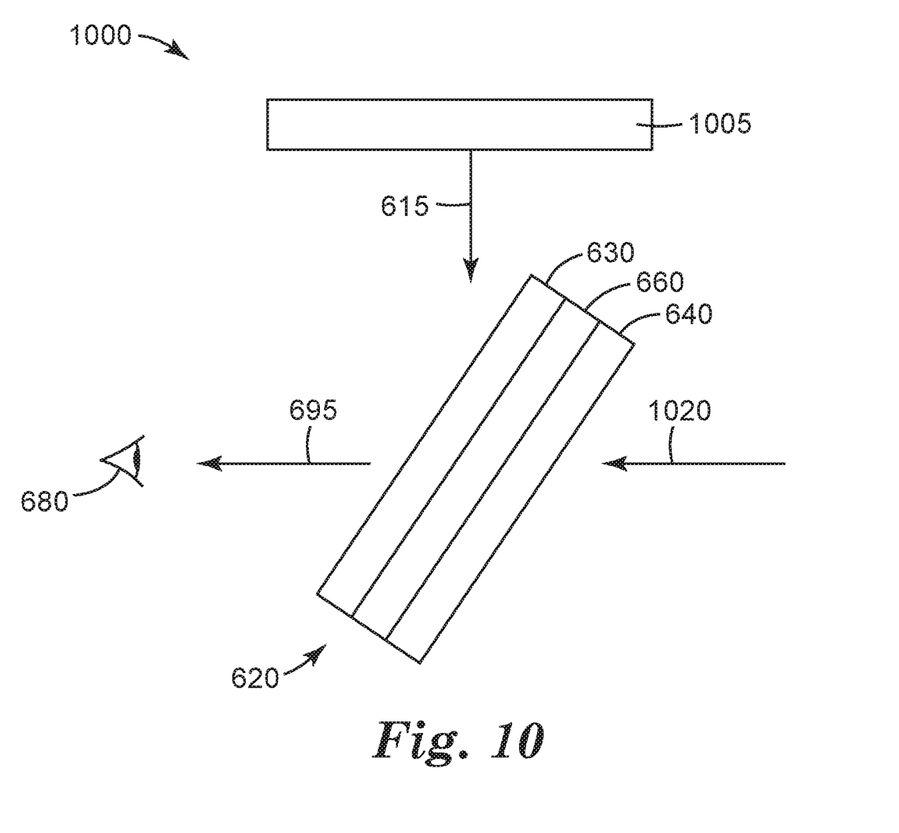
FIG. 10 is a schematic view of a reflective-transmissive-type imaging system.

FIG. 8 is a schematic view of a reflective-type imaging system 800 where light 625 emitted by light source 605 is transmitted by polarizing beam splitter plate 620 toward imager 610 and is reflected by the imager as imaged light 615 toward the splitter plate which reflects the imaged light as reflected light 695 toward viewer 680. Since multilayer optical film reflective polarizer 640 is substantially flat, the reflected imaged light 695 has vastly improved effective pixel resolution. FIG. 9 is a schematic view of a transmissive-type imaging system 900 where light 625 emitted by light source 605 is reflected by polarizing beam splitter plate 620 toward imager 610 and is reflected by the imager as imaged light 615 toward the beam splitter plate which transmits the imaged light as transmitted light 695 toward screen 690 (or viewer 680 similar to system 800 in FIG. 8). Since multilayer optical film reflective polarizer 640 is substantially flat, light that is reflected by the beam splitter plate toward the imager illuminates the imager with vastly improved uniformity. FIG. 10 is a schematic view of a reflective-transmissive-type imaging system 1000 where imaged light 615 emitted by an imaged light source 1005 is reflected by polarizing beam splitter plate 620 toward viewer 680. Viewer 680 may also view an ambient image carried by ambient light 1020 and transmitted by beam splitter plate 620.

Polarizing beam splitter plate 620 can be manufactured using any process or method disclosed herein. For example, polarizing beam splitter plate 620 can be constructed or manufactured using a process disclosed in relation to FIGS. 4 and 5 except that prisms 560 and 580 are replaced with substrates 630 and 650.

The following are a list of items of the present disclosure:
Item 1 is polarization subsystem comprising:
a first imager; and
a polarizing beam splitter plate for receiving imaged light from the imager and comprising:
   a first substrate;
   a multilayer optical film reflective polarizer disposed on the first substrate;
   a first outermost major surface; and
   an opposing second outermost major surface making an angle of less than about 20 degrees with the first outermost major surface,
wherein the polarizing beam splitter plate reflects the received imaged light towards a viewer or screen with the reflected imaged light having an effective pixel resolution of less than 12 microns.

Item 2 is the polarization subsystem of item 1, wherein the second outermost major surface makes an angle of less than about 15 degrees with the first outermost major surface.

Item 3 is the polarization subsystem of item 1, wherein the second outermost major surface makes an angle of less than about 10 degrees with the first outermost major surface.

Item 4 is the polarization subsystem of item 1, wherein the second outermost major surface makes an angle of less than about 5 degrees with the first outermost major surface.

Item 5 is the polarization subsystem of item 1, wherein the second outermost major surface makes an angle of less than about 2 degrees with the first outermost major surface.

Item 6 is the polarization subsystem of item 1, wherein a maximum separation between the first and second outermost major surfaces is less than about 1.5 mm.

Item 7 is the polarization subsystem of item 1, wherein a maximum separation between the first and second outermost major surfaces is less than about 1 mm.

Item 8 is the polarization subsystem of item 1, wherein a maximum separation between the first and second outermost major surfaces is less than about 0.75 mm.

Item 9 is the polarization subsystem of item 1, wherein a maximum separation between the first and second outermost major surfaces is less than about 0.5 mm.

Item 10 is the polarization subsystem of item 1, wherein at least one of the first and second outermost major surfaces comprises a curved portion.

Item 11 is the polarization subsystem of item 1, wherein at least one of the first and second outermost major surfaces is concave.

Item 12 is the polarization subsystem of item 1, wherein at least one of the first and second outermost major surfaces curves away from the polarizing beam splitter plate.

Item 13 is the polarization subsystem of item 1, wherein at least one of the first and second outermost major surfaces is convex.

Item 14 is the polarization subsystem of item 1, wherein at least one of the first and second outermost major surfaces curves toward the polarizing beam splitter plate.

Item 15 is the polarization subsystem of item 1, wherein the multilayer optical film reflective polarizer is adhered to the first substrate by an adhesive.

Item 16 is the polarization subsystem of item 1, wherein the first substrate comprises glass.

Item 17 is the polarization subsystem of item 1, wherein the first substrate comprises a polymer.

Item 18 is the polarization subsystem of item 1 further comprising a second substrate, the multilayer optical film reflective polarizer being disposed between the first and second substrates.

Item 19 is the polarization subsystem of item 18, wherein the multilayer optical film reflective polarizer is adhered to the first and second substrates by an adhesive.

Item 20 is the polarization subsystem of item 1, wherein the polarizing beam splitter plate reflects the received imaged light towards the viewer or screen with the reflected imaged light having an effective pixel resolution of less than 9 microns.

Item 21 is the polarization subsystem of item 1, wherein the polarizing beam splitter plate reflects the received imaged light towards the viewer or screen with the reflected imaged light having an effective pixel resolution of less than 6 microns.

Item 22 is the polarization subsystem of item 1, wherein the first imager comprises an LCOS imager.

Item 23 is the polarization subsystem of item 1, further comprising a projection lens that receives light from the polarizing beam splitter plate after light is imaged and projects it towards the viewer or screen.

Item 24 is the polarization subsystem of item 1, wherein the multilayer optical film reflective polarizer has a surface roughness Ra of less than 45 nm or a surface roughness Rq of less than 80 nm.

Item 25 is a three-dimensional image projector comprising the polarization subsystem of item 1.

Item 26 is a polarizing beam splitter plate comprising:
a first substrate;
a second substrate;
a multilayer optical film reflective polarizer disposed between and adhered to the first and second substrates;
a first outermost major surface; and
an opposing second outermost major surface making an angle of less than about 20 degrees with the first outermost major surface, wherein the polarizing beam splitter plate is adapted to reflect imaged light towards a viewer or screen, the reflected imaged light having an effective pixel resolution of less than 12 microns.

Item 27 is the polarizing beam splitter plate of item 26, wherein the polarizing beam splitter plate is adapted to reflect imaged light towards the viewer or screen, the reflected imaged light having an effective pixel resolution of less than 9 microns.

Item 28 is the polarizing beam splitter plate of item 26, wherein the polarizing beam splitter plate is adapted to reflect imaged light towards the viewer or screen, the reflected imaged light having an effective pixel resolution of less than 6 microns.

Item 29 is the polarizing beam splitter plate of item 26, wherein the first substrate comprises glass or a polymer.

Item 30 is the polarizing beam splitter plate of item 26, wherein the second substrate comprises glass or a polymer.

Item 31 is the polarizing beam splitter plate of item 26, wherein the multilayer optical film reflective polarizer is adhered to the first and second substrates with a pressure sensitive adhesive, a UV cured adhesive, or an optical epoxy.

Item 32 is the polarizing beam splitter plate of item 26, wherein the multilayer optical film reflective polarizer has a surface roughness Ra of less than 45 nm or a surface roughness Rq of less than 80 nm.

Item 33 is the polarizing beam splitter plate of item 26, wherein at least one of the first and second substrates has a diffuse transmission of less than about 2%.

Item 34 is the polarizing beam splitter plate of item 26, wherein at least one of the first and second substrates has a diffuse transmission of less than about 1%.

Item 35 is a projection subsystem, comprising:
a light source;
a first imager imaging light received from the light source; and
a polarizing beam splitter plate receiving the imaged light from the first imager and comprising:
a multilayer optical film reflective polarizer;
a first outermost major surface; and
an opposing second outermost major surface making an angle of less than about 20 degrees with the first outermost major surface;
wherein the polarizing beam splitter plate reflects the received imaged light towards an image plane with an effective pixel resolution of less than 12 microns.

Item 36 is a the projection subsystem of item 35, wherein the polarizing beam splitter plate reflects the received imaged light towards the image plane with an effective pixel resolution of less than 9 microns.

Item 37 is the projection subsystem of item 35, wherein the polarizing beam splitter plate reflects the received imaged light towards the image plane with an effective pixel resolution of less than 6 microns.

Item 38 is the projection subsystem of item 35, wherein the light source comprises an LED.

Item 39 is the projection subsystem of item 35, wherein the multilayer optical film reflective polarizer has a surface roughness Ra of less than 45 nm or a surface roughness Rq of less than 80 nm.

Item 40 is a projection system comprising the projection subsystem of item 35, the first imager being pixelated and comprising a plurality of pixels, the projection system projecting images of the pixels in the plurality of pixels onto a screen, each pixel having an expected location and area on the screen, an actual location of each pixel on the screen being within a circle centered on the expected location of the pixel and having an area that is less than 50 times the expected area of the pixel.

Item 41 is a projection system comprising the projection subsystem of item 35, the first imager being pixelated and comprising a plurality of pixels, the projection system projecting images of the pixels in the plurality of pixels onto a screen, each pixel having an expected location and area on the screen, an actual location of each pixel on the screen being within a circle centered on the expected location of the pixel and having an area that is less than 10 times the expected area of the pixel.

Item 42 is a projection system comprising the projection subsystem of item 35, the first imager being pixelated and comprising a plurality of pixels, the projection system projecting images of the pixels in the plurality of pixels onto a screen, each pixel having an expected location and area on the screen, an actual location of each pixel on the screen being within a circle centered on the expected location of the pixel and having an area that is less than 5 times the expected area of the pixel.

Item 43 is a projection system comprising the projection subsystem of item 35, the first imager being pixelated and comprising a plurality of pixels, the projection system projecting images of the pixels in the plurality of pixels onto a screen, each pixel having an expected area on the screen and an actual area on the screen, the actual area of each projected pixel on the screen being less than 5 times the expected area of the projected pixel on the screen.

Item 44 is a projection system comprising the projection subsystem of item 35, the first imager being pixelated and comprising a plurality of pixels, the projection system projecting images of the pixels in the plurality of pixels onto a screen, each pixel having an expected area on the screen and an actual area on the screen, the actual area of each projected pixel on the screen being less than 2 times the expected area of the projected pixel on the screen.

Item 45 is a polarization subsystem comprising:
a first imager; and
a polarizing beam splitter plate receiving imaged light from the imager and comprising:
  a multilayer optical film reflective polarizer;
  a first outermost major surface; and
  an opposing second outermost major surface making an angle of less than about 20 degrees with the first outermost major surface;
wherein the polarizing beam splitter plate reflects the received imaged light towards a viewer or screen, and wherein the multilayer optical film reflective polarizer has a surface roughness Ra of less than 45 nm or a surface roughness Rq of less than 80 nm.

Item 46 is the projection subsystem of item 45, wherein the multilayer optical film reflective polarizer has a surface roughness Ra of less than 40 nm or a surface roughness Rq of less than 70 nm.

Item 47 is the projection subsystem of item 45, wherein the multilayer optical film reflective polarizer has a surface roughness Ra of less than 35 nm or a surface roughness Rq of less than 55 nm.

Item 48 is a method of producing a flat film, comprising:
providing a multilayer optical film;
providing a temporary flat substrate;
releasably attaching a first surface of the multilayer optical film to the temporary flat substrate;
providing a permanent substrate, the permanent substrate comprising a first outermost major surface and an opposing second outermost major surface making an angle of less than about 20 degrees with the first outermost major surface;
attaching a second surface of the multilayer optical film to the permanent substrate; and
removing the multilayer optical film from the temporary flat substrate.

Item 49 is the method of item 48, wherein the step of releasably attaching the first surface of the multilayer optical film to the temporary flat substrate comprises:
wetting the surface of the temporary flat substrate with a wetting agent to create a wet surface of the temporary flat substrate;
applying the multilayer optical film on the surface of the temporary flat substrate;
squeegeeing the multilayer optical film on the surface of the temporary flat substrate; and
allowing the multilayer optical film, the temporary flat substrate, and the wetting agent to dry.

Item 50 is the method of item 49, wherein the surface of the substrate is wetted by spraying the wetting agent onto the substrate.

Item 51 is the method of item 49, wherein the wetting agent is a mild detergent solution.

Item 52 is the method of item 51, wherein the mild detergent solution comprises less than 1% detergent in an aqueous solution.

Item 53 is a the method of item 49, wherein the step of allowing the multilayer optical film, the temporary flat substrate, and the wetting agent to dry causes the surface of the multilayer optical film to conform to the temporary flat substrate.

Item 54 is the method of item 49, wherein the step of allowing the multilayer optical film, the temporary flat substrate, and the wetting agent to dry comprises wicking the wetting agent between the optical film and the flat substrate to edges of the multilayer optical film for the wetting agent to evaporate and causing a vacuum sealing between the multilayer optical film and the temporary flat substrate.

Item 55 is the method of item 49, wherein a protective layer is applied to the multilayer optical film on the side opposite the surface applied to the flat substrate before squeegeeing.

Item 56 is the method of item 48, wherein the step of removing the multilayer optical film from the temporary flat substrate comprises peeling the multilayer optical film from the substrate.

Item 57 is the method of item 48, wherein the temporary flat substrate comprises acrylic glass.

Item 58 is a method of producing a polarizing beam splitter plate comprising:
applying an adhesive on the film produced by the method of item 48 on the side of the film opposite the permanent substrate; and
applying a second permanent substrate against the adhesive.

Item 59 is the method of item 58 further comprising curing the construction.

Item 60 is the method of item 59, wherein curing comprises UV curing.

Item 61 is the method of item 58, wherein the adhesive comprises an optical adhesive.

Item 62 is the method of item 48, wherein the surface of the multilayer optical film that previously faced the temporary flat substrate has a surface roughness of Ra of less than 45 nm or a surface roughness Rq of less than 80 nm.

Item 63 is a method of creating an optically flat polarizing beam splitter plate, comprising:
providing a multilayer optical film reflective polarizer;
applying a layer of pressure sensitive adhesive to a first surface of the multilayer optical film;
applying a first substrate against the pressure sensitive adhesive layer on the side opposite the multilayer optical film, the first substrate comprising a first outermost major surface and an opposing second outermost major surface making an angle of less than about 20 degrees with the first outermost major surface; and
applying vacuum to the pressure sensitive adhesive, the multilayer optical film, and the first substrate.

Item 64 is the method of item 63 further comprising:
applying a second layer of adhesive to a second surface of the multilayer optical film opposite the first surface; and
applying a second substrate to the opposite side of the second layer of adhesive from the multilayer optical film, the second substrate comprising a first outermost major surface and an opposing second outermost major surface making an angle of less than about 20 degrees with the first outermost major surface.

Item 65 is the method of item 64 further comprising applying vacuum to the second layer of adhesive, the multilayer optical film, and the second substrate.

Item 66 is the method of item 65, wherein the vacuum is applied to the construction by placing the construction in a vacuum chamber.

The present invention should not be considered limited to the particular examples and embodiments described above, as such embodiments are described in detail to facilitate explanation of various aspects of the invention. Rather the present invention should be understood to cover all aspects of the invention, including various modifications, equivalent processes, and alternative devices falling within the spirit and scope of the invention as defined by the appended claims.

We claim:

1. An optical assembly comprising:
an optically transparent substrate comprising opposing non-parallel major surfaces making an angle less than about 20 degrees therebetween; and
a multilayer polymeric optical film adhered to one of the major surfaces of the substrate, the optical film configured to substantially reflect light having a first polarization state and substantially transmit light having an orthogonal second polarization state, the optical film having a major surface, such that a root mean square average of a deviation of the major surface along a thickness direction of the optical film is less than 80 nm.

2. The optical assembly of claim 1, wherein a root mean square average of a deviation of the major surface along the thickness direction of the optical film is less than 70 nm.

3. The optical assembly of claim 1, wherein a root mean square average of a deviation of the major surface along the thickness direction of the optical film is less than 55 nm.

4. The optical assembly of claim 1, wherein an average of an absolute value of the deviation of the major surface along the thickness direction of the optical film is less than 45 nm.

5. The optical assembly of claim 1, wherein an average of an absolute value of the deviation of the major surface along the thickness direction of the optical film is less than 35 nm.

6. The optical assembly of claim 1, wherein the optical film is adhered to the substrate via an adhesive layer.

7. The optical assembly of claim 1, wherein the substrate comprises a glass.

8. The optical assembly of claim 1, wherein the substrate comprises a polymer.

9. A polarizing beam splitter comprising the optical assembly of claim 1.

10. A projection system comprising the optical assembly of claim 1.

* * * * *